June 2, 1936.                     P. T. HART ET AL                     2,043,166
                              AWARD DISPENSING MACHINE
                       Filed Feb. 14, 1935            7 Sheets-Sheet 1

June 2, 1936.   P. T. HART ET AL   2,043,166
AWARD DISPENSING MACHINE
Filed Feb. 14, 1935   7 Sheets-Sheet 2

Percy T. Hart
Fielding J. Glaser   INVENTOR
BY Victor J. Evans & Co.
ATTORNEY

June 2, 1936.  P. T. HART ET AL  2,043,166
AWARD DISPENSING MACHINE
Filed Feb. 14, 1935  7 Sheets-Sheet 3

Percy T. Hart
Fielding J. Glaser
INVENTOR

BY Victor J. Evans & Co.
ATTORNEY

June 2, 1936.  P. T. HART ET AL  2,043,166
AWARD DISPENSING MACHINE
Filed Feb. 14, 1935  7 Sheets-Sheet 4

Percy T. Hart
Fielding J. Glaser
INVENTOR

BY Victor J. Evans & Co.
ATTORNEY

Patented June 2, 1936

2,043,166

UNITED STATES PATENT OFFICE 2,043,166

AWARD DISPENSING MACHINE

Percy T. Hart and Fielding J. Glaser, New Orleans, La.; said Glaser assignor to said Hart Application February 14, 1935, Serial No. 6,547

13 Claims. (Cl. 273—138)

The invention relates to an award dispensing machine and more especially to a vending machine for prize awarding of merchandise and commodities.

The primary object of the invention is the provision of a machine of this character, wherein a playing surface simulates a roulette set-up excepting there is eliminated gaming features and by the skill of a player of the machine in the use of movable objects and the pocketing of a determined number of these objects awards to the player a prize which is automatically dispensed by the machine.

Another object of the invention is the provision of a machine of this character, wherein a player when successfully being awarded a prize automatically dispensed from the machine the said player is retarded from acquiring a second or more prizes excepting by the deposit of a further or second coin or token within the machine and in the award it is most essential that the player relies solely upon skill for such award.

A further object of the invention is the provision of a machine of this character, wherein the award, prize or merchandise, commodities or the like are on display and in full view thus encouraging an observer to try his or her skill in the playing of the machine for the procurement of the attractive prize to that person, the machine in its entirety being of novel construction and is assured of positiveness and ease of operation without liability of becoming stalled when being used by a player.

A still further object of the invention is the provision of a machine of this character, wherein any person, adult or child, is not required to be experienced in the playing of the machine but does require skill on the part of the player to be successful in the award of a prize from the machine.

A still further object of the invention is the provision of a machine of this character, wherein the mechanism in the assembly and construction eliminates any possibility of cheating by a player for fraudulent award or awards as the said machine will not make delivery of an award unless through skill of the operator and the legitimate working of the machine.

A still further object of the invention is the provision of a machine of this character, wherein safety means is made a part thereof so that there is no possibility of excess or overworking of the machine resultant from time delays perpetrated by a player because a play time limit is present for activity of the machine, that is to say, should it be a fact that the player stalls in the predetermined number of plays afforded to him or her the machine will not continuously operate as a time period exists for inactivity of the machine between individual plays or any group thereof.

A still further object of the invention is the provision of a machine of this character, which is comparatively simple in construction, thoroughly reliable and efficient in its operation, extraordinarily attractive in its appearance, affording amusement and attraction to a player, requiring skill in the playing thereof, strong, durable, and comparatively inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings.

Similar reference characters indicate corresponding parts throughout the several views in the drawings.

Figure 1:
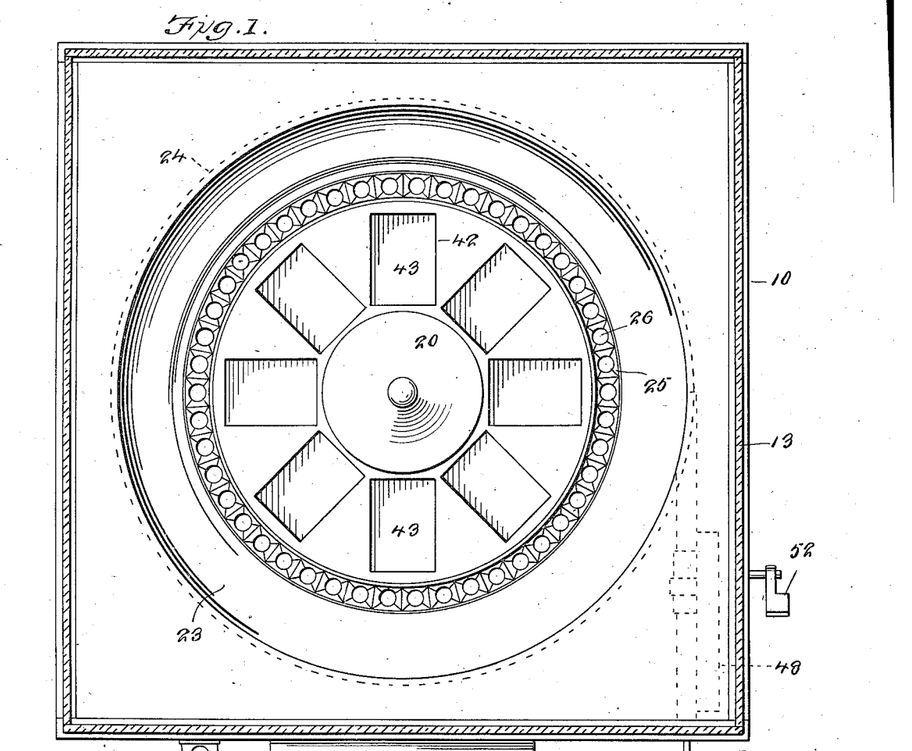
Figure 1 is a top plan view of the machine constructed in accordance with the invention.
Figure 2:
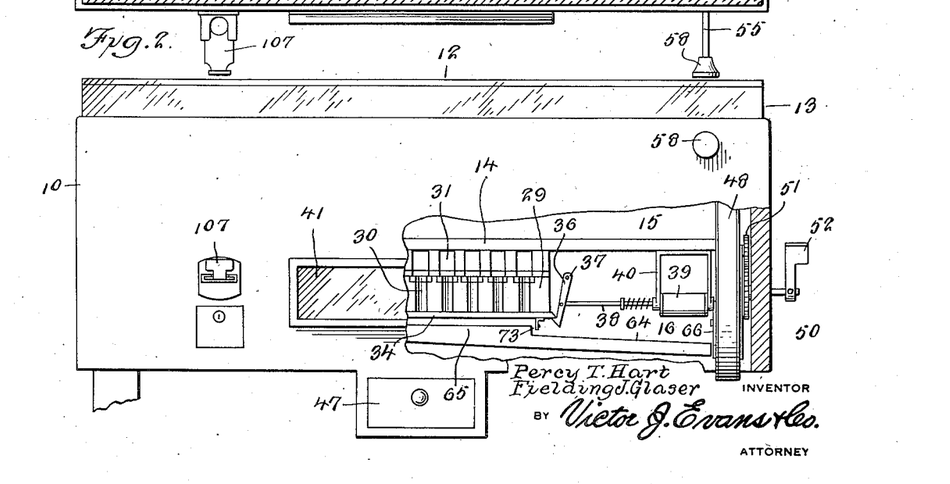
Figure 2 is a fragmentary front elevation partly broken away.
Figure 3:
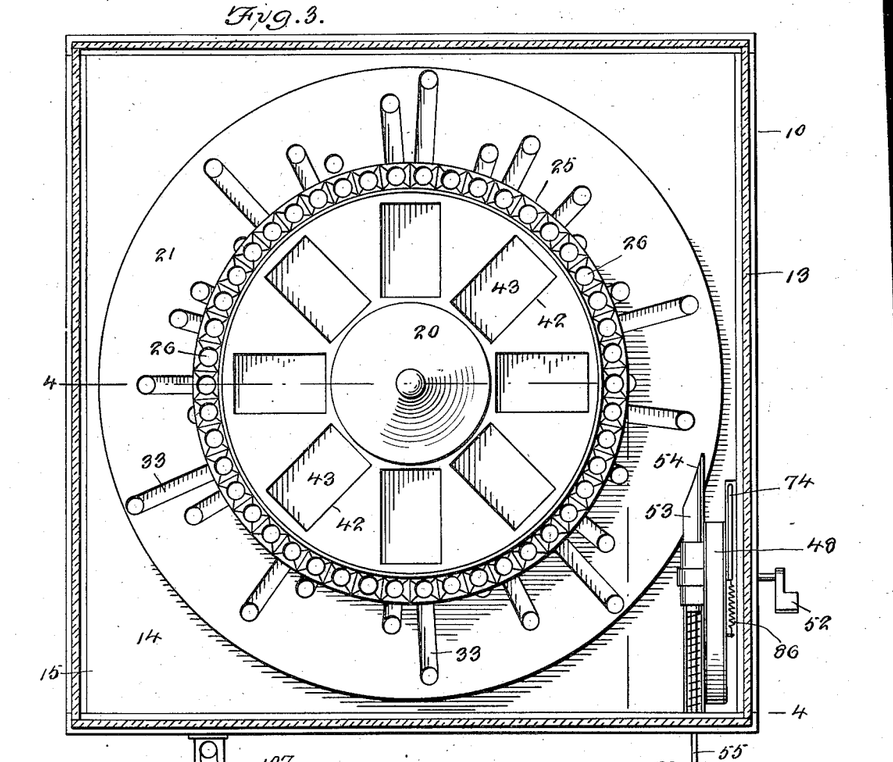
Figure 3 is a sectional view approximately on the line 3—3 of Figure 4.
Figure 4:
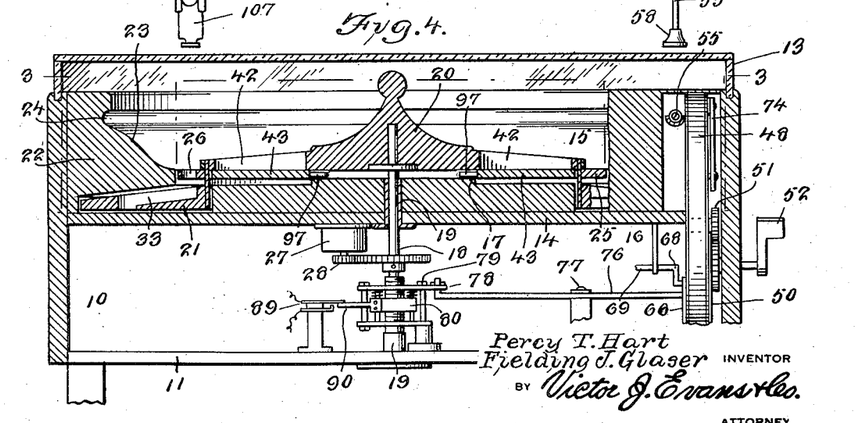
Figure 4 is a sectional view on the line 4—4 of Figure 3.
Figure 5:
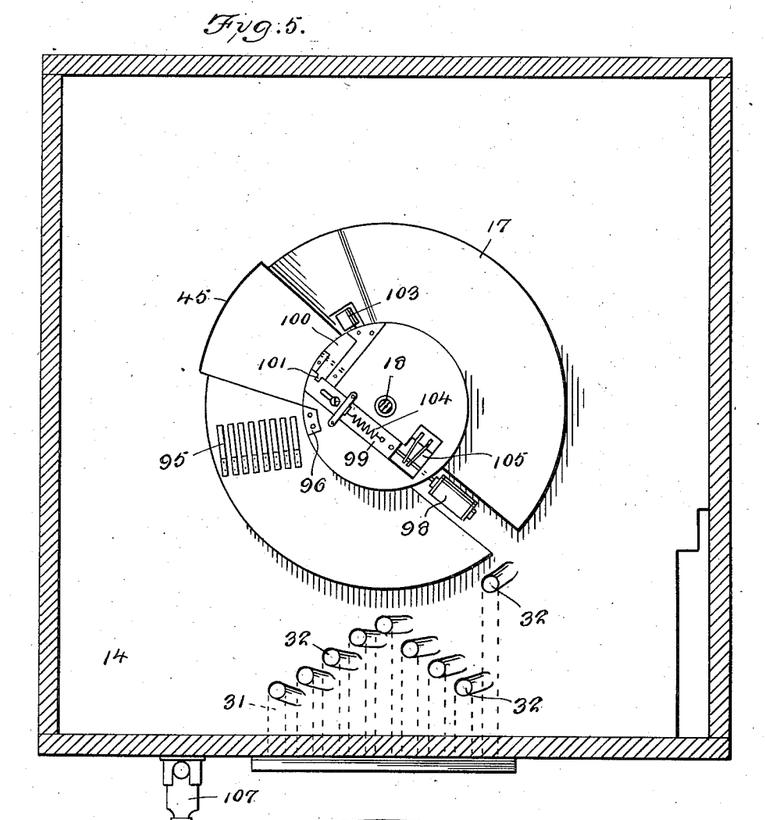
Figure 5 is a horizontal sectional view showing in plan the track and track switch and other adjuncts.
Figure 6:
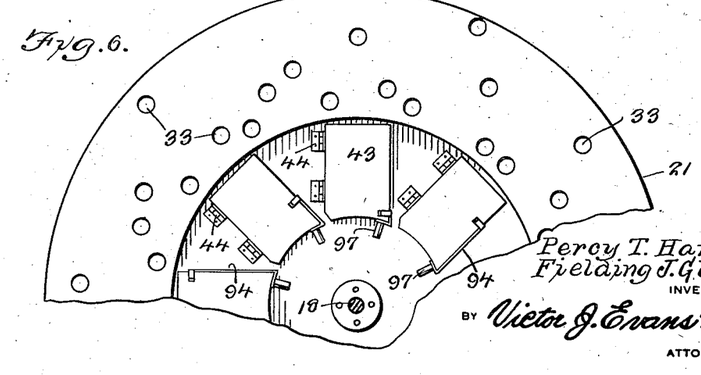
Figure 6 is a fragmentary bottom plan view of the rotor of the machine.
Figures 7, 8, 9, 10, 21, 22:
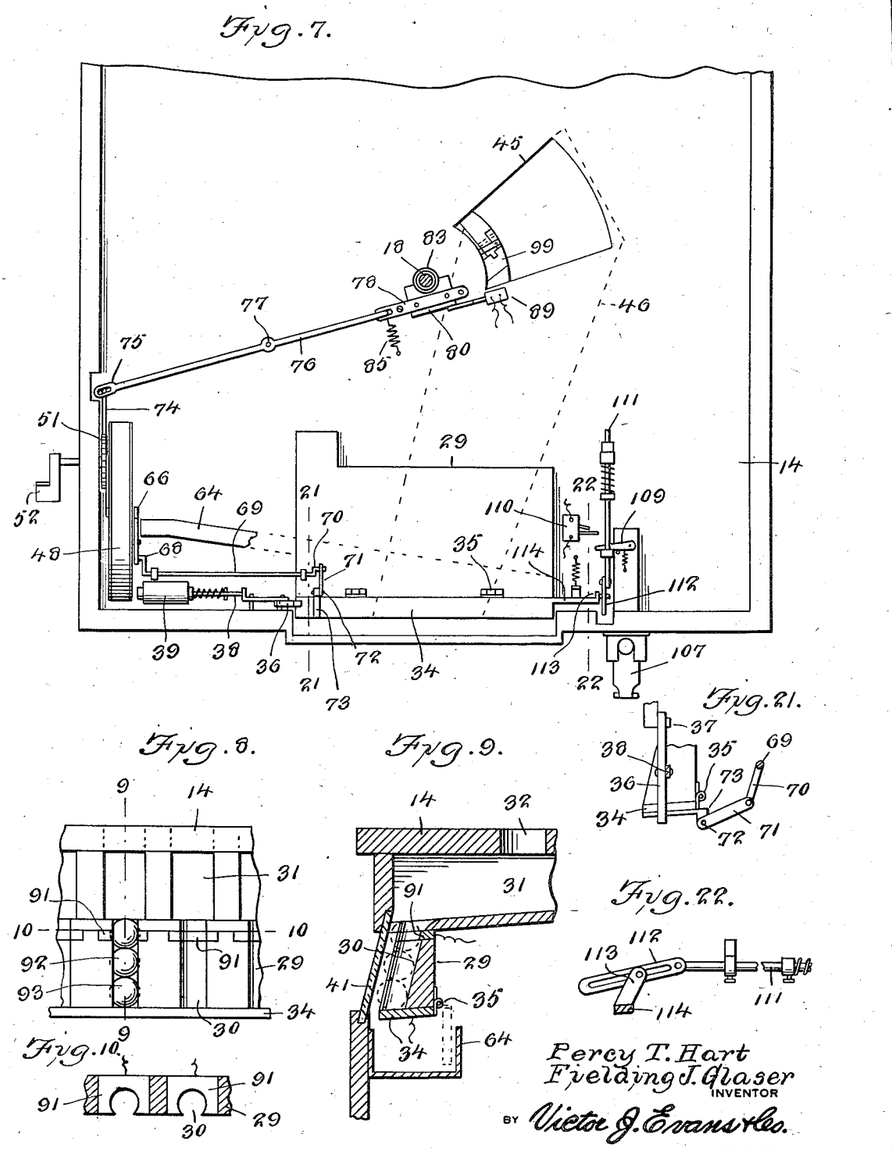
Figure 7 is a fragmentary bottom plan view of the machine.
Figure 8 is a fragmentary elevation of the ball pockets and adjuncts.
Figure 9 is a sectional view on the line 9—9 of Figure 8.
Figure 10 is a sectional view on the line 10—10 of Figure 8.
Figure 21 is a sectional view on the line 21—21 of Figure 7.
Figure 22 is a sectional view on line 22—22 of Figure 7.
Figure 11:
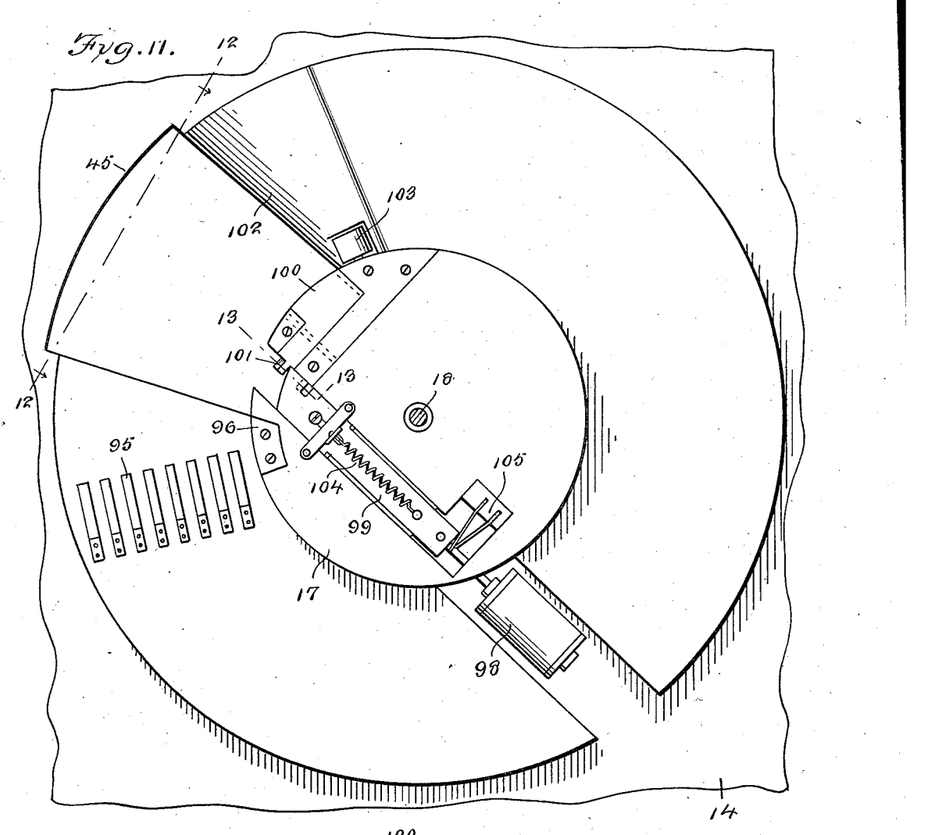
Figure 11 is a fragmentary enlarged view similar to Figure 5 showing the parts in adjusted position.
Figure 12:
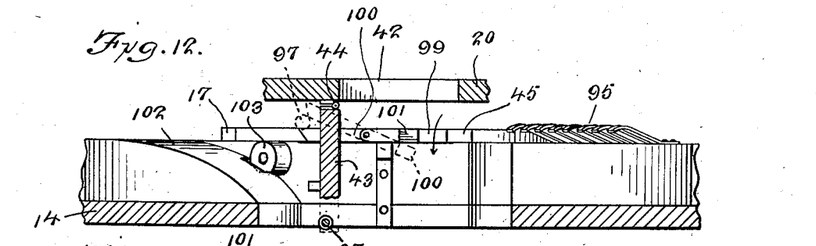
Figure 12 is a sectional view on the line 12—12 of Figure 11.
Figure 13:
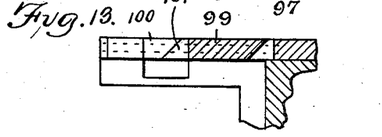
Figure 13 is a fragmentary sectional view on the line 13—13 of Figure 11.
Figures 14, 15, 16, 17:
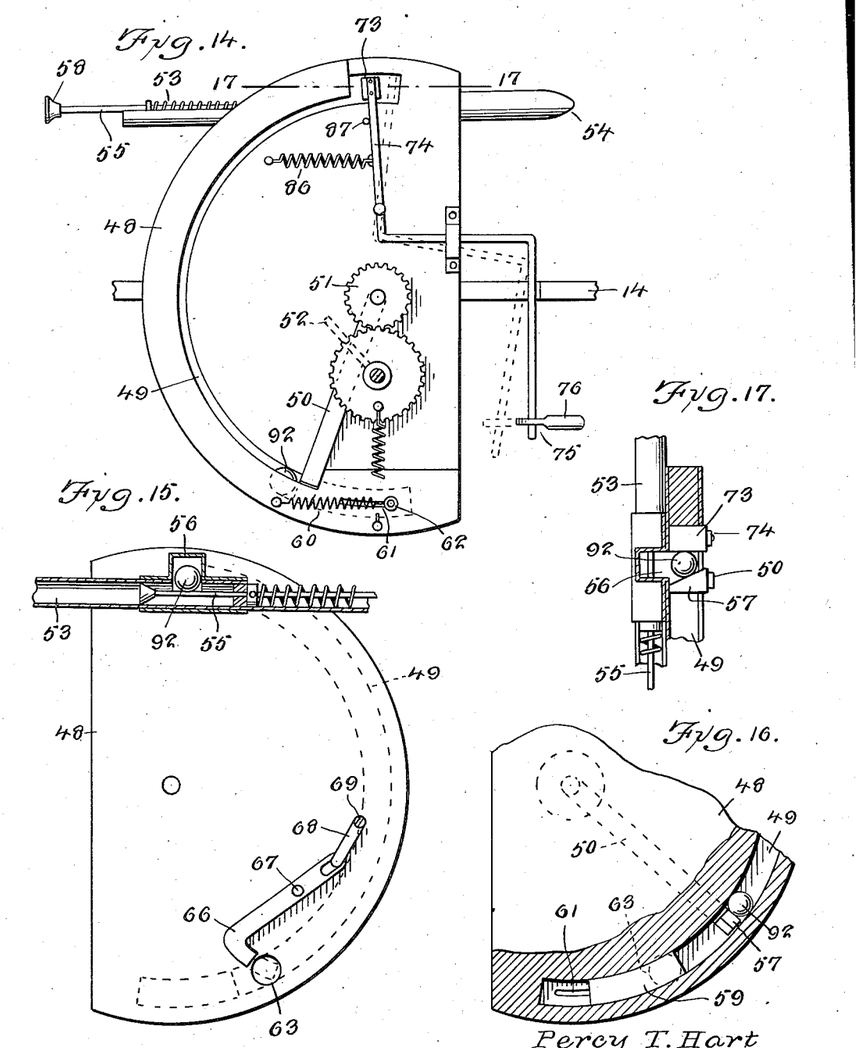
Figure 14 is a side elevation of the ball lifting mechanism.
Figure 15 is a view similar to Figure 14 looking toward the opposite side thereof and showing the ball actuator in vertical section.
Figure 16 is a fragmentary sectional view through the ball lifter.
Figure 17 is a sectional view on the line 17—17 of Figure 14.
Figure 18:
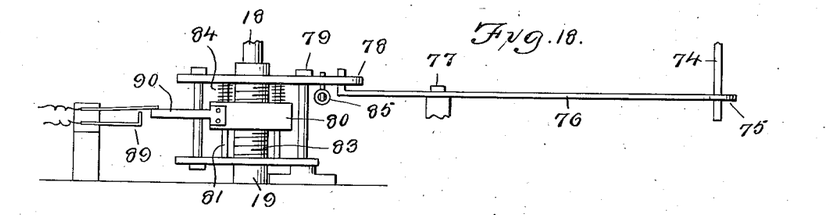
Figure 18 is a fragmentary side elevation of the top of the machine.
Figure 19:
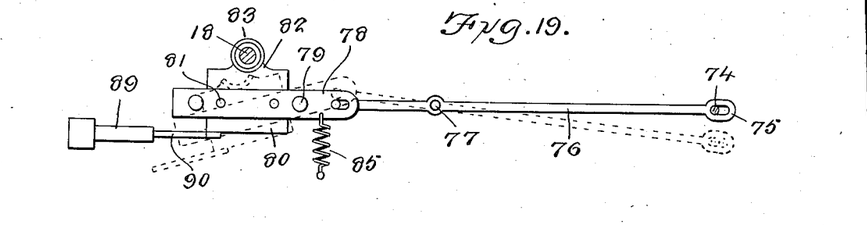
Figure 19 is a top plan view thereof showing by full lines in one position and by dotted lines in another position.
Figure 20:
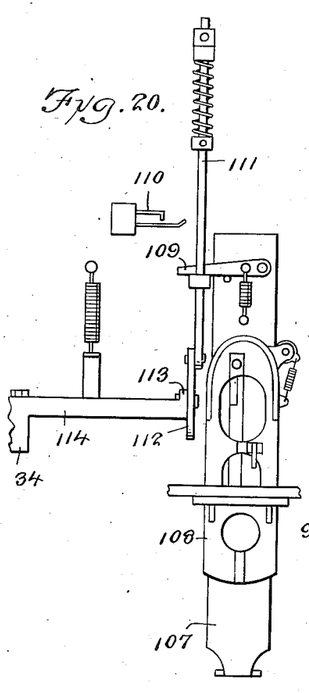
Figure 20 is a fragmentary detailed bottom plan view of the coin control.
Figure 23:
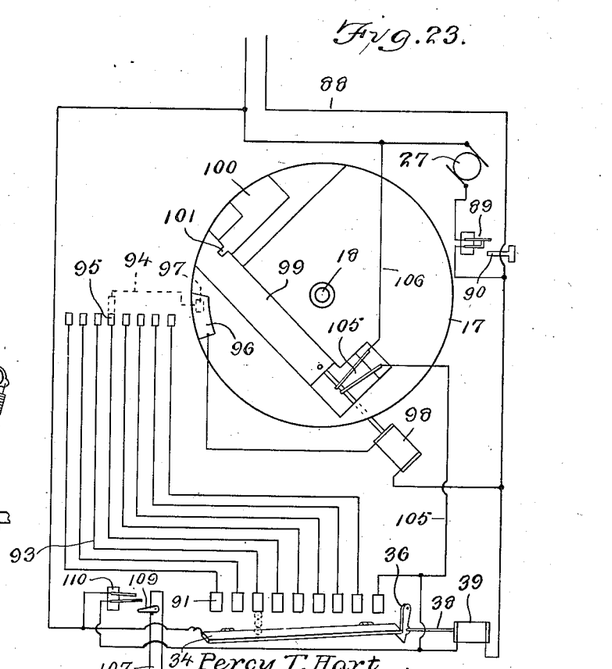
Figure 23 is a diagrammatic plan view of the electric circuit layout in the machine.

Referring to the drawings in detail, the machine comprises a box like body or casing 10, its walls being preferably solid having the closed bottom 11 while the top is open and a glass panel or cover 12 fits this open top, the cover being equipped with vertical opposite side walls 13 which are suitably fitted with the vertical walls of the body or casing 10 so that full view can be had through the open top of the latter. Arranged within the body or casing 10 is a flooring 14 dividing the said body or casing into upper and lower compartments, chambers or the like 15 and 16, respectively. The flooring 14 has rising therefrom a center circular crown forming a track 17 and through this track at its center is passed a driving shaft 18 fitting a suitable journal 19 arranged in the flooring and crown. Superposed with relation to the track 17 and carried by the shaft 19 is a rotor 20 in its design simulating the spinner of a roulette machine and is formed with a downwardly stepped marginal circular or annular rim 21 which for a major extent thereof has an overhanging bowed wall 22 of circular contour and formed near the top of the bowl 23 provided thereby is an annular race or channel 24. This wall corresponds in its shape and layout to the body of a roulette machine and said bowl 23 opens upwardly, the rim 21 being concentric with respect to the crown or track 17. Formed with the rotor 20 and overlapping the rim 21 is an annular apertured ledge or flange 25, the apertures 26 being uniformly spaced apart from each other throughout the ledge or flange. This ledge or flange 25 has concentrically about the same the wall 22 and the upper surface of said ledge or flange is flush with the bottom of the bowl 23 so that the spherical or ball objects travelling in the race 24 and in the bowl 23 will be urged in the direction of the ledge or flange for dropping into the apertures 26 therein for a purpose presently described.

Suitably fixed within the compartment or chamber 16 and hung from the flooring 14 is an electric motor 27 having through the medium of a train of reducing gears 28 driving connection with the shaft 19 for giving to the rotor 20 the desired speed of rotation.

Located within the compartment or chamber 16 forwardly of the body or casing 10 is a horizontal rack 29 having spaced forwardly inclined ball receiving pockets 30, these being in the vertical and are open at the top and bottom, the tops being communicative with passages 31 beneath the flooring 14 while the latter has provided therein the ports 32 communicative respectively with the said ways or passages 31. The ports are arranged in eschelon to be staggered or diagonally offset relative to each other. Within the rim 21 of the rotor 20 are guideways 33, these opening through the rim for communication with the respective apertures 26 and ports 32 so that when a ball or balls drop in these apertures 26 it or they will find the way to the pockets 30.

For opening and closing the bottom open ends of the pockets 30 there is arranged beneath the rack 29 a drop gate 34 swinging vertically on a hinge 35 and releasably held closed by a latch 36 susceptible of tripping action and pivotally supported at 37 as well as being connected by a coil plunger 38 with a solenoid 39 fixedly held in a hanger 40 within the compartment or chamber 16. The front of the body or casing 10 has fitted therein a window 41 in confronting relation to the rack 29 so that the pockets 30 can be clearly viewed from without.

Provided in the rotor 20 are radially disposed door openings 42 concentrically about the axis of said rotor and closed by drop doors 43 each carried by hinges 44 fixed to the under side of the rotor and at one side of the door opening companion thereto. Provided in the flooring 14 and extended into the crown or track for a distance thereof is a delivery opening 45 common to the respective door openings 42 and of sector form and size to permit the opening of the door 43 when its door opening registers therewith. Leading from this delivery opening 45 is a forwardly inclined chute 46 which extends to the front of the body or casing 10 and there communicates with a drawer 47 slidably fitting the body or casing and constituting a depository which when pulled outwardly gives free access to its contents.

Within the body or casing 10 at one side of the rack 29 is a ball lifting device having a vertically disposed circular housing 48 provided with an arcuate ball way 49 into which extends a lift arm 50 swingingly journaled and operated from gearing 51 movable by a finger piece 52 accessible exteriorly of the body or casing 10 at one side thereof. At the uppermost portion of the housing 48 is a shooting barrel 53 the discharge end 54 of which leads into the race 24 and working in this barrel is a spring operated manually controlled sending plunger 55 for a ball when within the barrel 53 to have it roll through the race 24 into the bowl 23 and travel haphazard for deposit in any one of the apertures 26. This barrel through the port 56 communicates with the uppermost portion of the ball way 49 and the arm 50 carries a deflector tip 57 which directs the ball into the port 56 for admission into the barrel 53 for the shooting of said ball by the plunger 55 when manually controlled. This plunger 55 is projected through the front of the casing or body 10 and is equipped with a suitable push knob 58 for manual control thereof.

At the lowermost end of the ball way 49 is a follower slide 59 which is spring advanced as at 60 and is limited in said advancement by the slot 61 and stop pin 62 working therein. The purpose of this follower slide 59 is to avoid the possibility of a ball working its way in rear of the lifter arm 50 so as to defeat the lifting of the ball by said arm within the ball way 49 for the loading of the barrel 53 in the single shot action of the machine.

The housing 48 at the inner side thereof and at the lowermost point of the ball way 49 is provided with a ball entrance port or opening 63 to which leads a supply conveyer 64 which is inclined in the direction of said port 63 and has the receiving mouth or end 65 immediately beneath the rack 29 and common to the series or groups of pockets 30 provided therein so that when the gate 34 is open the contents of these pockets will be received by the conveyer 64 and carried to the entrance port for admission to the ball lifter. This port 63 has cooperating therewith a closure 66 in the form of a lever pivoted at 67 connected with a crank 68 of a rocking shaft 69 suitably journaled and having a second crank 70 connected with a link 71 pivoted at 72 to a bracket 73 carried by the gate 34. Thus when the gate 34 is opened the closure 66 is automatically moved to a position to shut off the port 63 for the admission of balls within the conveyer 64 into the ball lifter. On the closing of the gate the port 63 is opened and balls in single order can be admitted to the ball lifter from the conveyer 64.

At the uppermost or high end of the ball way 49 to be disposed in advance of the deflector tip 57 for action by a ball lifted by the lifter arm 50 is a bumper head 73 carried by an actuator lever 74 which has connection at 75 with an arm 76 pivoted at 77 for horizontal swing and connected with a guide frame 78 journaled at 79 for horizontal swing movement. Fitted within this frame 78 is a threaded feed block 80 vertically slidable upon guides 81 within the frame 78 and the threaded side 82 thereof is engageable with a feed screw 83 on the drive shaft 18. The block 80 is of sufficient weight to drop to lowermost position when disengaged from the feed screw 83, yet there is provided springs 84 which function against the block 80 to cause it to move to lowermost position in the frame 78 when uncoupled or disengaged from the screw 83. The lateral swinging movement of the frame 78 causes the meshing of the block 80 with the screw 83 and this frame has connected therewith the spring 85 for urging the block into meshing engagement with the screw, the block being retreated laterally therefrom when the arm 75 is operated by having the lifter arm 50 act upon a ball within the ball way 49 to exert pressure on the head 73 and thus disturb the actuator lever 74. This lever 74 has connected with it a spring 86 which functions to normally hold the lever 74 against a stop 87 on the housing 48 and in a position to be forced by a ball when pressed against the head 73 of the lever. Arranged within an electric circuit 88 for the motor 27 is a switch 89 which when closed will be automatically opened by a striker 90 carried by the block 80 and this opening action takes place when the said block 80 has been lifted under the meshing engagement of the block with the feed screw 83. On the opening of the switch 89 the motor 27 stops. This block 80 and the said screw 83 is a time stop control in the machine so that the machine will come to a standstill, that is to say, the rotor after the starting of the motor 27 at a determined interval, that is to say, instantly on the opening of the switch 89. The block 80 on disengaging it from the said screw 83 lowers in the frame 78 to engage with the lowermost portion of the screw 83 for the feeding of said block opwardly to a position for the opening of the switch 89, the switch being instantly closed when the block lowers in the frame 78.

At the top of the rack 29 common to the respective pockets 30 and insulated from each other are contacts 91, these being at a height from the gate 34 when closed, the latter also constituting a contact when in this position so that when a stack of a determined number of balls 92 occupy a pocket 30 in the rack there will have been completed a circuit individual to that particular pocket occupied by the said stack of balls as at 93 and the completion of this circuit is effected through the medium of a circuit closer upon each door 43 in the form of a gap bridge strap 94 coacting with a spring wiper terminal contact 95 and a terminal roller contact 96, the latter being upon the crown or track 17 and is engaged by the roller 97 carried by the strap 94 for travel upon said track to maintain the doors 43 closed until released by the completing of the said circuit 93 for the opening of said door. This contact 96 upon the track is common to the series of brush contacts 95 so that the circuit individual to the respective pockets 30 will be automatically closed by the stack of balls 92 and the circuit closer individual to the respective doors and common to these individual circuits 93 is a solenoid 98 which when energized operates upon a latch bolt 99 slidably fitted in the track 17 to move said bolt to unlatching position in the path of said roller 97 upon that particular circuit closer effecting the completion of the circuit between the contacts 95 and 96 whereby a door 43 can drop to open position through the delivery opening 45 in the flooring 14, it being understood that this particular circuit 93 thus closed will be instantly opened when the roller 97 rides off of the contact 96, and the bolt previously thrown for the dropping of the door. The dropping of the door discharges an article supported thereon into the delivery chute 46 for deposit in the drawer 47. Mounted in the track is a track switch 100 this being pivoted for vertical swinging movement at one side of the bolt 99 and is formed with a keeper nib 101 for engaging the bolt 99 when either in latching or unlatching position. The bolt when in latching position automatically trips the nib 101 so that said bolt can be moved to unlatching position by the solenoid 98 when energized but this nib 101 maintains the said bolt 99 in unlatching position until the switch is tripped by the roller 97 on the door 43 in that this door when in open position is in the path of a cam surface 102 fitted with an anti-friction roller 103 so that the said door 43 in its dropped or open position when riding upon this cam surface 102 immediately next to the delivery opening 45 and the roller 103 it will be automatically moved to closing position bringing the roller 97 into engagement with the track switch 100 for the tripping thereof and the passing of this roller upon the track 17 during the rotation of the rotor 20 and thus the said door becoming closed. The tripping of the track switch 100 frees the bolt 99 which through a spring 104 will be thrown to latching position which is the normal position thereof so that the doors 43 will be maintained closed with the rollers 97 travelling upon the track 17. In the path of the bolt 99 in its rearward or unlatching stroke is a normally opened electric switch 105 which is included in the circuit 106 having the solenoid 39 therein so that this circuit 106 will be closed on the unlatching of the bolt 99 and the solenoid 39 energized to retract the latch 36 whereby the gate 34 will open allowing the pockets 30 in the rack 29 occupied by balls 92 to discharge their contents into the conveyer 65 whence they will travel to the ball lift 48. When the stack of balls 92 in any of the pockets 30 in the rack 29 is not sufficient for effecting contact between the gate 34 when closed and the contacts 91 it will be impossible for any one of the doors to drop to open position because it is necessary that a circuit be closed to the solenoid 98 for moving the bolt 99 to unlatching position with respect to the said doors 43.

Carried at the front of the body or casing 10 is a slide member 107 of a coin control 108. The specific construction of this coin control 108 forms no part of the present invention and since it is not desired that this present invention be restricted to the use of any particular specific construction it is not deemed necessary here to illustrate or describe such specific construction. It may be said, however, that suitable means (not shown) normally holds the slide in forward position and that only on the deposit of a coin can the slide be pushed back so that a trip dog 109 on the slide 107 will first operate a switch 110 which is normally opened for the closing thereof and this switch is included in the circuit having the solenoid 39 therein so that should the gate 34 be closed the latch 36 will be operated to open the gate and permit the discharge of all balls 92 within the pockets 30 in the rack 29 into the conveyer 65 for their flow to the ball lifter. This dog 109 secondly operates a spring plunger 111 which is through the link 112 connected with a bracket 113 formed on an extension 114 on the gate 34 so that the said gate after initial opening movement will be moved to closed position, these opening and closing movements of the gate being in close succession. The gate 34 when closed renders the pockets 30 in the rack 29 receptive to the balls 92 for the stacking thereof.

In the use of the machine articles of merchandise or commodities are placed on the rotor 20 to have the same at rest upon the doors 43, these being closed for the supporting of such articles. The articles are the awards or prizes in the playing or working of the machine. Now, it is desirable to have each door representative by hues of distinguishable colors from each other and likewise the apertures 26 in the ledge 25 and the pockets 30, respectively, congruous with one another. A coin, token or the like of a determined denomination or value acceptable to the slide 107 is deposited in the coin control 108, the slide being released so that it can be pushed inwardly, the initial action of this slide closes the switch 110 energizing the solenoid 39 for the instant release of the gate 34 so that the pockets 30 will be freed of balls 92 therein if they be within the same. Further inward travel of the slide 107 through the plunger 11 closes the gate 34 so that the pockets 30 are receptive of balls 92. It is, of course, understood that at the beginning or at the time that the coin is deposited within the machine the block 80 in the frame 78 is at the highest point of movement and the switch 89 in the motor circuit 88 is held open so that the motor 27 is passive or stopped. Now, all balls, ten in number, are in the conveyer 64 and when the gate 34 in its first opening movement has operated the closure 66 closing the port 63 to the ball lifter but when this gate 34 closes the port 63 opens by the closure 66 moving therefrom and the ball 92 next to the port is admissible to the ball lifter. The operator now manipulates the hand piece 52 so that the ball within the lifter or the ball way 49 will be raised by the arm 50 in said way and on the upward travel of this ball it is first brought in contact with the head 73 and through physical force the lever 74 is operated and the ball carried into the barrel 53. The lever 74 actuates the frame 78 to retreat the block 80 from feeding connection with the feed screw 83 and such block drops in the said frame 78 so that the switch 89 closes and thereby starting the motor 27 which drives the rotor 20. The operator of the machine manipulates the shooting plunger 55 causing the ball 92 within the barrel 53 to be sent at a determined impetus into the bowl 23 and in the travel of this ball within the bowl it finds its way to an aperture 26 in the ledge 25 whence the ball by the passage 33 goes its way into one of the pockets 30 for occupancy therein. This operation is repeated until the number of balls allotted to a player, namely ten, have been utilized in the shooting of the same excepting that should a player be successful in causing the deposit of the required number of balls in one of the pockets to effect a stack of a size that will close an electric circuit to that particular pocket 30 in the rack 29 this effecting the energizing of the solenoid 98 and the retraction of bolt 99 that when the door 43 by its circuit closer completes this particular circuit the said door will automatically open at the delivery opening 45 and the prize carried by this door will be discharged through said opening and dispensed from the machine. Concurrently therewith the switch 105 closes the circuit to the solenoid 39 for actuating the latch 36 whereby the gate 34 will swing open and the balls within the pockets 30 discharge therefrom. Of course, on the discharge of the stack of balls the circuit to the particular pocket carrying the stack will be opened by reason of the fact that the balls of the stack break engagement of contact between the gate 34 and the superposed contact 91 of the rack 29. This opening of the door 43 and the gate 34 under its opening closes the port 63 so that balls can not enter the ball lift from the conveyer 65. The operator of the machine will be shut off from the use of the remaining balls of the group allotted to him in exchange for the coin deposited within the machine so that the player of the machine is limited to the acquiring of but one prize for the deposit of one coin or the like in the machine irrespective of the number of balls allotted to this particular player for that deposit. Now, the activity of the player in shooting the balls under the allotment is limited to a safety device, namely the block 80 coacting with the feed screw 83 because the time period of operation of the motor 27 is controlled by this safety device so that the said motor is not overtaxed for excess working because this safety device will stop the motor at a predetermined period because on the rise of the block 80 the horn 90 thereon will engage with the switch 89 which when the block is in a lower position is closed so that this switch will be automatically opened and the motor stopped. This safety device avoids any excess working of the motor 27 because the same will be stopped at a predetermined period of run thereof irrespective of the activity of the player of the machine. It often happens that when a player shoots one ball 92 in the machine he might be tardy in shooting the second, third or other balls of the allotment awarded to him and if the safety device were not present the motor would have been required to continuously run. It is, of course, optional with the possessor of the machine to have the individual circuits to the respective pockets completed for the award of a prize by filling any number of a certain group of said pockets with the stack of balls so that these pockets will be not included for the award of a prize will be known as hazards in the playing of the game.

The assemblage of the machine in its construction as hereinbefore set forth makes it clearly apparent that such machine in its build is devoid of the necessity of numerous run ways or courses for definite travel in many directions of the movable object played within the machine. In other words, the travel layout for the movable objects is of the simplest form and additionally the machine is absolutely foolproof and this not surreptitiously operated, there being required the exercise of skill in the playing of the machine for the acquisition of a prize or award. The player is restricted in the playing of the game to the maximum allotment of balls but, of course, if he be successful in the award of the prize from the machine on a lesser number of balls he forfeits the remaining number of balls of such allotment in that the machine is locked for further playing except by the deposit of another coin therein. Furthermore, the hazard feature defeats the player in that the stack of three balls within this hazard pocket shuts off the player from a continued playing of the machine except by the deposit of another coin therein.

From the foregoing it is thought that the construction and manner of operation of the machine will be clearly understood and therefore a more extended explanation has been omitted for the fact of brevity. Furthermore, it is to be understood that changes, variations and modifications may be made in the structure without departing from the spirit of the invention or sacrificing any of its advantages provided the changes, variations and modifications come within the scope of the appended claims.

What is claimed is:

1. In a machine of the character described, comprising a carrier movably supported, delivering means directed to one area of the carrier for dispensing articles from the same, means for the delivery of an article from the carrier to the delivering means and automatically operated by a travelling object sent into the machine, means for pocketing the object, means for discharging the object from the pocket and means for bringing the object to a position to be sent.

2. In a machine of the character described, comprising a carrier movably supported, delivering means directed to one area of the carrier for dispensing articles from the same, means for the delivery of an article from the carrier to the delivering means and automatically operated by a travelling object sent into the machine, means for pocketing the object, means for discharging the object from the pocket, means for bringing the object to a position to be sent and means for carrying the object into play.

3. In a machine of the character described, comprising a carrier movably supported, delivering means directed to one area of the carrier for dispensing articles from the same, means for the delivery of an article from the carrier to the delivering means and automatically operated by a travelling object sent into the machine, means for pocketing the object, means for discharging the object from the pocket, means for bringing the object to a position to be sent, means for carrying the object into play and means for moving the carrier.

4. In a machine of the character described, comprising a carrier movably supported, delivering means directed to one area of the carrier for dispensing articles from the same, means for the delivery of an article from the carrier to the delivering means and automatically operated by a travelling object sent into the machine, means for pocketing the object, means for discharging the object from the pocket, means for bringing the object to a position to be sent, means for carrying the object into play, means for moving the carrier and means for regulating the movement of the carrier.

5. In a machine of the character described, comprising a carrier movably supported, delivering means directed to one area of the carrier for dispensing articles from the same, means for the delivery of an article from the carrier to the delivering means and automatically operated by a travelling object sent into the machine, means for pocketing the object, means for discharging the object from the pocket, means for bringing the object to a position to be sent, means for carrying the object into play, means for moving the carrier and means for regulating the movement of the carrier, and controlled by the object when brought to position for travel.

6. In a machine of the character described, comprising a carrier movably supported, delivering means directed to one area of the carrier for dispensing articles from the same, means for the delivery of an article from the carrier to the delivering means and automatically operated by a travelling object sent into the machine, means for pocketing the object, means for discharging the object from the pocket, means for bringing the object to a position to be sent, means for carrying the object into play, means for moving the carrier, means for regulating the movement of the carrier, and controlled by the object when brought to position for travel and means for preventing the object from reaching the fifth-named means until the pocket has been closed against discharge.

7. In a machine of the character described, comprising a carrier movably supported, delivering means directed to one area of the carrier for dispensing articles from the same, means for the delivery of an article from the carrier to the delivering means and automatically operated by a travelling object sent into the machine, means for pocketing the object, means for discharging the object from the pocket, means for bringing the object to a position to be sent, means for carrying the object into play, means for moving the carrier, means for regulating the movement of the carrier, and controlled by the object when brought to position for travel, means for preventing the object from reaching the fifth-named means until the pocket has been closed against discharge and means actuating the fourth-named means to prevent discharge from the pocket and admitting the object to the fifth-named means.

8. In a machine of the character described, comprising a carrier movably supported, delivering means directed to one area of the carrier for dispensing articles from the same, means for the delivery of an article from the carrier to the delivering means and automatically operated by a travelling object sent into the machine, means for pocketing the object, means for discharging the object from the pocket, means for bringing the object to a position to be sent, means for carrying the object into play, means for moving the carrier, means for regulating the movement of the carrier, and controlled by the object when brought to position for travel, means for preventing the object from reaching the fifth-named means until the pocket has been closed against discharge, means actuating the fourth-named means to prevent discharge from the pocket and admitting the object to the fifth-named means and a bowled wall about the carrier and forming a race.

9. In a machine of the character described, comprising a carrier movably supported, delivering means directed to one area of the carrier for dispensing articles from the same, means for the delivery of an article from the carrier to the delivering means and automatically operated by a travelling object sent into the machine, means for pocketing the object, means for discharging the object from the pocket, means for bringing the object to a position to be sent, means for carrying the object into play, means for moving the carrier, means for regulating the movement of the carrier, and controlled by the object when brought to position for travel, means for preventing the object from reaching the fifth-named means until the pocket has been closed against discharge, means actuating the fourth-named means to prevent discharge from the pocket and admitting the object to the fifth-named means, a bowled wall about the carrier and forming a race and electric means for controlling the discharge means.

10. In a machine of the character described, comprising a carrier movably supported, delivering means directed to one area of the carrier for dispensing articles from the same, means for the delivery of an article from the carrier to the delivering means and automatically operated by a travelling object sent into the machine, means for pocketing the object, means for discharging the object from the pocket, means for bringing the object to a position to be sent, means for carrying the object into play, means for moving the carrier, means for regulating the movement of the carrier, and controlled by the object when brought to position for travel, means for preventing the object from reaching the fifth-named means until the pocket has been closed against discharge, means actuating the fourth-named means to prevent discharge from the pocket and admitting the object to the fifth-named means, a bowled wall about the carrier and forming a race, electric means for controlling the discharge means and trackage for the carrier.

11. In a machine of the character described, comprising a carrier movably supported, delivering means directed to one area of the carrier for dispensing articles from the same, means for the delivery of an article from the carrier to the delivering means and automatically operated by a travelling object sent into the machine, means for pocketing the object, means for discharging the object from the pocket, means for bringing the object to a position to be sent, means for carrying the object into play, means for moving the carrier, means for regulating the movement of the carrier, and controlled by the object when brought to position for travel, means for preventing the object from reaching the fifth-named means until the pocket has been closed against discharge, means actuating the fourth-named means to prevent discharge from the pocket and admitting the object to the fifth-named means, a bowled wall about the carrier and forming a race, electric means for controlling the discharge means, trackage for the carrier and an enclosure for the bowled wall and carrier.

12. In a machine of the character described, comprising a carrier movably supported, delivering means directed to one area of the carrier for dispensing articles from the same, means for the delivery of an article from the carrier to the delivering means and automatically operated by a travelling object sent into the machine, means for pocketing the object, means for discharging the object from the pocket, means for bringing the object to a position to be sent, means for carrying the object into play, means for moving the carrier, means for regulating the movement of the carrier, and controlled by the object when brought to position for travel, means for preventing the object from reaching the fifth-named means until the pocket has been closed against discharge, means actuating the fourth-named means to prevent discharge from the pocket and admitting the object to the fifth-named means, a bowled wall about the carrier and forming a race, electric means for controlling the discharge means, trackage for the carrier, an enclosure for the bowled wall and carrier and means coacting with the carrier at the period of dispensing an article for effecting discharge of the object from the pocket.

13. In a machine of the character described, comprising a carrier movably supported, delivering means directed to one area of the carrier for dispensing articles from the same, means for the delivery of an article from the carrier to the delivering means and automatically operated by a travelling object sent into the machine, means for pocketing the object, means for discharging the object from the pocket, means for bringing the object to a position to be sent, means for carrying the object into play, means for moving the carrier, means for regulating the movement of the carrier, and controlled by the object when brought to position for travel, means for preventing the object from reaching the fifth-named means until the pocket has been closed against discharge, means actuating the fourth-named means to prevent discharge from the pocket and admitting the object to the fifth-named means, a bowled wall about the carrier and forming a race, electric means for controlling the discharge means, trackage for the carrier, an enclosure for the bowled wall and carrier, means coacting with the carrier at the period of dispensing an article for effecting discharge of the object from the pocket and means for receiving the dispensed articles.

PERCY T. HART.
FIELDING J. GLASER.